United States Patent Office 3,647,784
Patented Mar. 7, 1972

3,647,784
PREPARATION OF STEROIDAL FORMATE ESTERS
Reinhardt P. Stein, Conshohocken, Robert C. Smith, Jr., King of Prussia, and Herchel Smith, Bryn Mawr, Pa., assignors to American Home Products Corporation, New York, N.Y.
No Drawing. Continuation-in-part of application Ser. No. 706,659, Feb. 19, 1968. This application Feb. 2, 1970, Ser. No. 8,056
Int. Cl. C07c 173/00
U.S. Cl. 260—239.55 R
26 Claims

ABSTRACT OF THE DISCLOSURE

A procedure is disclosed for the selective preparation of steroidal formate esters from corresponding steroid alcohols. Products formed by the conversion are not only hormonally useful in the animal body but are also useful for further reactions of the steroid nucleus.

This application is a continuation-in-part of now abandoned U.S. patent application, Ser. No. 706,659, filed Feb. 19, 1968 and entitled "Preparation of Steroidal Formate Esters."

The invention relates to the preparation of steroidal formate esters and more particularly describes a novel process for the conversion of selected steroidal alcohols to steroidal formate esters. This is accomplished by the use of dimethylformamide and an alkane or aromatic sulfonyl halide.

The inventive process has as an object, a simple and fast method of introducing an ester function on steroidal alcohols without causing unnecessary side reactions. A second and highly important object is to protect a reactive hydroxyl group against further reactions involving the steroid molecule. Yet another object is to prepare biologically active compounds, for example, compounds having hormonal utility as estrogenic and hypocholestermic agents, particularly of longer duration of action. These and other objects will become apparent from the following description.

It has been found that certain steroidal alcohols, namely, steroids having at least one reactive hydroxyl group, that is neither hindered nor phenolic in character, can be protected from further proposed reactions by first treating such a compound with dimethylformamide and an alkane or aromatic sulfonyl halide to form a formate ester of said reactive group. Under similar conditions, it has been found that an 8 or 11-hydroxy group on a steroid molecule, for example, or a phenolic hydroxy group on an aromatic A ring, will not react. Following this selective formylation step other reactions may be carried out without disturbing this group.

Thus, among the possible substrates that could be used for the process are those falling within any of the following examples or types illustrated below:

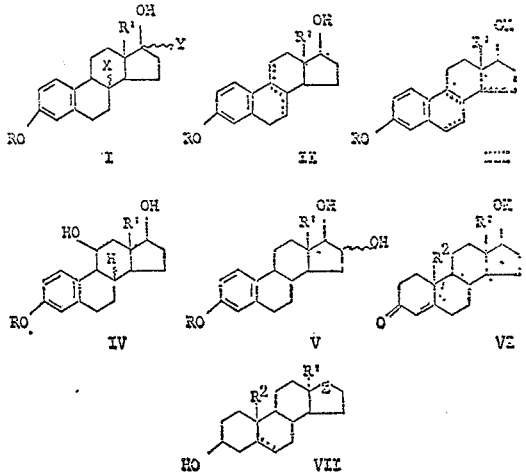

In the above structural types, R may represent hydrogen, a lower alkyl of 1 to 6 carbon atoms, a lower cycloalkyl of 3 to 6 carbon atoms or an acyl radical, preferably a lower alkanoyl of 1 to 6 carbon atoms, benzoyl or a monocyclic aralkanoyl of 8 to 9 carbon atoms. $R^1$ stands for lower alkyl of 1 to 4 carbon atoms, $R^2$ stands for hydrogen or lower alkyl, preferably methyl, X represents either hydrogen or hydroxyl, Y stands for hydrogen, lower alkyl of 1 to 3 carbon atoms, lower alkenyl and lower alkynyl, each preferably of 2 to 3 carbon atoms, while Z may represent methylene, hydroxymethylene, acyloxymethylene or the $C_8H_{17}$-methylene moiety of cholestanes.

In type II, the dotted lines may represent a double bond at C–7, C–8, or C–9(11).

In type III, the dotted lines may represent double bonds at C–6 and C–8, or double bonds at C–8 and C–14.

In type VII, the dotted line may represent either the presence or absence of a double bond.

The wavy lines at C–8, C–16, and C–17 are intended to represent either the α or β configuration.

Illustrative of compounds suitable as substrates and falling within the groups or types mentioned above are such type steroids as androstan-3β,11β-diol-17-one,
androst-5-ene-3β,17β-diol,
estrane-3α,17α, diol, corticosterone,
testosterone, α-estradiol, ethynyl estradiol,
dl-3-methoxyestra-1,3,5(10)-trien-17β-ol,
dl-3-methoxy-13-ethyl-8α-gona-1,3,5(10)-trien-17β-ol,
d-estra-1,3,5(10)-triene-3,17β-diol,
dl-3-methoxyestra-1,3,5(10)-triene-8,17β-diol,
dl-3-methoxy-13-ethylgona-1,3,5(10)-triene-8,17β-diol,
dl-3-methoxyestra-1,3,5(10), 8-tetraen-17β-ol,
d-estra-1,3,5(10), 7-tetraene-3,17β-diol,
dl-3-methoxyestra-1,3,5(10), 8,14-pentaen-17β-ol,
dl-13-ethyl-17β-hydroxygona-4-en-3-one,
dl-3-methoxy-8α-estra-1,3,5(10)-triene-11,17β-diol,
dl-13-ethylgona-1,3,5(10)-triene-3,16α,17β-triol,
d-cholesterol, d-cholestanol.

All of the starting compounds are known, noting U.S. Pat. No. 3,202,686, issued Feb. 7, 1967 and British Pat. No. 1,041,279, published Sept. 1, 1966, or may be prepared as taught in the applications of Hughes and Smith, Ser. No. 228,384, filed Oct. 4, 1962, entitled "Steroid Synthesis," and application, Ser. No. 534,353, filed Mar. 15, 1966, now U.S. Pat. No. 3,519,714 entitled "Synthesis of Gona-1,3,5(10)-trienes."

The process involves the treatment of a dimethylformamide solution of the steroidal alcohol with an alkane or aromatic sulfonyl halide, preferably an alkane sulfonyl halide of 1 to 6 carbon atoms and more preferably, methane sulfonyl chloride, at a temperature from 0° C. to 40° C., although room temperature is preferable. The reaction time is relatively short, so that isomerization or dehydration does not occur. Thus, the reaction is carried out for several minutes to several hours, suitably from about 3 minutes to an hour. A mild organic base may be used as an acid acceptor, for example pyridine, but this is not essential.

Thus, in carrying out the process as described and treating type I compounds where R is hydroxy and X is hydroxyl, only the 17-hydroxyl group reacts to form the formate ester. The same is true with respect to type II, III, and IV, where only the 17-hydroxyl group reacts. It has also been found that neither the hydroxyl group at the 3- nor the 11-positions as illustrated in the type IV compounds will react under the relatively mild conditions of the disclosed process. Full support for these findings are based on knowledge of the reactants and the products obtained. Analysis of these products from a molecular weight standpoint and spectrographic examination confirm the molecular structure.

It may also be mentioned that drastic conditions of ester formation as is generally utilized could have unsought for effects on the steroid moiety itself. For example, a type II or III compound having a double bond in the 8-position might isomerize to one having a double bond in the 9(11)-position. Furthermore, relatively drastic conditions have resulted in dehydrating a compound of type I where X is hydroxyl to a desired steroid having a double bond in the 7-position. Similar conditions could also modify a type IV compound with a resultant 9(11) double bond in the steroid nucleus.

The utility of the inventive process lies not only in achieving through the formation of the ester a desired alternation in the magnitude or duration of the biological activity inherent in the starting substrate which is not itself dependent on the function undergoing esterification, but more importantly the process is highly selective in that it is useful for protecting certain reactive hydroxyl groups where it is desired to carry out further reactions which may involve highly hindered or phenolic hydroxyl groups.

An example involving steroidal phenols will illustrate the utility of the invention. In this example the process is used to convert the important biologically-active estrogen d-17β-dihydro-equilin to its formate ester using the conditions indicated above. The formate ester so formed, with the 17-hydroxyl function effectively protected, may now be treated to convert phenolic hydroxyl to its sulfate ester by methods previously described in the literature (i.e. by use of chlorsulfonic acid). Subsequent treatment of the sulfate ester with sodium hydroxide results in restoring the 17-hydroxyl group and forming the sodium salt, a naturally occurring active constitute of a clinically important estrogen preparation. The reactions may be generally illustrated as follows:

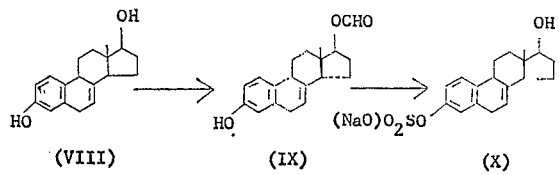

A further significance and advantage of the process of the invention is that the conditions are so mild that isomerizations, dehydrations, or rearrangements do not occur in substrates that are otherwise unstable when the usual conditions for ester formation are employed.

Similarly, the valuable process of the present invention may be used to selectively protect a hydroxyl group such as the 16α-hydroxyl function in an estriol, i.e. dl-13-ethylgona-1,3,5(10)-triene-3,16α,17β-triol (Formula XI), as illustrated following. In the reaction sequence A→B→C, following, the formation of a 16-formate ester is used to protect the hydroxyl function at that position while the 17-hydroxy is converted to a 17-one. In the sequence A→D→E→F→G, following, the formation of a 16-formate ester is used to protect the hydroxyl function while the 3 and 17-hydroxyl functions are converted to 2-tetrahydropyranethers allowing regeneration of the 16-hydroxyl function and its subsequent conversion to a 16-one with regeneration of the 3 and 17 hydroxy groups.

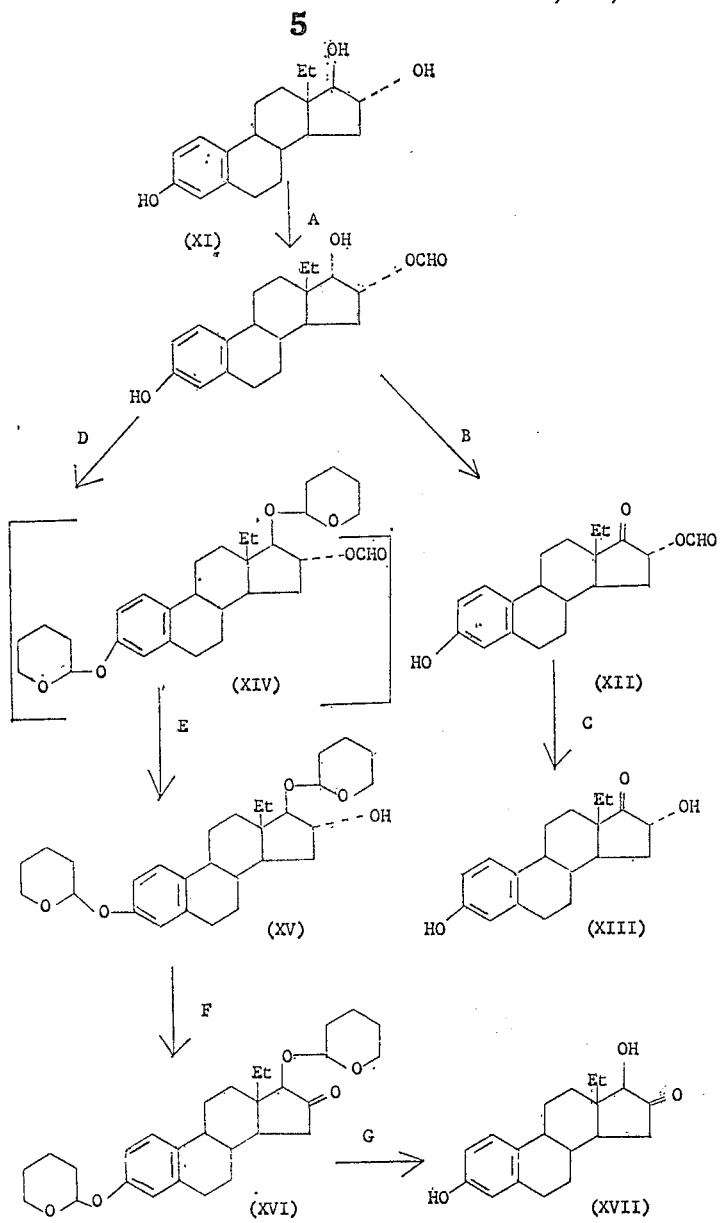

The following examples illustrate the novel process in greater detail as carried out with selected type compounds. It will be understood that temperatures are given in 0° centigrade.

It should be noted that in the product of a total synthesis which has not included a suitable resolution stage the compounds prepared by the invention will be present as racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

EXAMPLE 1 dl-3-methoxyestra-1,3,5(10)-trien-17β-ol, formate

Dissolve dl-3-methoxyestra-1,3,5(10)-trien-17β-ol (2.0 g.) in a freshly prepared mixture of dimethylformamide (25 ml.), pyridine (15 ml.) and methane sulfonyl chloride (5 ml.) and allow the solution to stand at room temperature for 15 minutes. Pour the reaction into icewater and filter the resulting solid. Chromatograph a benzene solution of the solid on 10% silver nitrate impregnated alumina. Evaporate the solvent in vacuo and crystallize the residue twice from isopropanol to obtain 1.24 g. of title product; M.P. 113–116°. Further purify a sample (0.30 g.) by thick layer chromatography on silica gel and recrystallize the resulting product from ether to obtain 0.10 g. of pure title product, M.P. 114–116°;

$$\lambda_{max.}^{KBr}\ 5.84\mu$$

Analysis.—Calcd. for $C_{20}H_{26}O_3$ (percent): C, 76.40; H, 8.34. Found (percent): C, 76.44; H, 8.35.

EXAMPLE 2 dl-13-ethyl-3-methoxy-8α-gona-1,3,5(10)-trien-17β-ol, formate

Dissolve dl - 13 - ethyl - 3 - methoxy - 8α - gona-1,3,5(10)-trien-17β-ol (2.0 g.) in a freshly prepared mixture of dimethylformamide (25 ml.), pyridine (15 ml.) and methane sulfonyl chloride (5 ml.) and allow the solution to stand at room temperature for 20 minutes. Pour the reaction into water and filter the resulting solid. Chromatograph the solid in benzene on 10% silver nitrate impregnated alumina, evaporate the solvent in vacuo and crystallize the residue from isopropanol to obtain 1.45 g. of the title product. Further purify a sample (0.40 g.) by thick-layer chromatography on silica gel to obtain after recrystallization of the product from ether, 0.14 g. of the title product; M.P. 129–131°;

$$\lambda_{max.}^{KBr} \ 5.87\mu$$

*Analysis.*—Calcd. for $C_{12}H_{28}O_3$ (percent): C, 76.79; H, 8.59. Found (percent): C, 76.58; H, 8.32.

EXAMPLE 3 d-Estra-1,3,5(10)-triene-3,17β-diol, 17-formate

Dissolve d-estra-1,3,5(10)-triene-3,17β-diol (1.00 g.) in dimethylformamide (15 ml.) then add methanesulfonyl chloride (3 ml.) and allow the reaction to stand at room temperature for 20 minutes. Add pyridine (6 ml.) then pour the mixture into water. After precipitation is complete, filter the solid into Super Cel and dry the mixture. Extract the Super Cel filter aid with ethyl acetate, filter and evaporate the solvent in vacuo. Treat the residue in methylene chloride with Nuchar charcoal, filter through Super Cel and remove the methylene chloride in vacuo. Dissolve the oil in methanol and with stirring add water dropwise to completely precipitate the product. Filter and dry to obtain 0.94 g. of the title product; M.P. 144–146°;

$$\lambda_{max.}^{KBr} \ 2.95 \ \text{and} \ 5.88\mu$$

EXAMPLE 4 dl-3-methoxyestra-1,3,5(10)-triene-8,17β-diol, 17-formate

Dissolve dl - 3 - methoxyestra-1,3,5(10)-triene-8,17β-diol (1.00 g.) in dimethylformamide (15 ml.), add methane sulfonyl chloride (3 ml.) and allow the reaction to stand at room temperature for 20 minutes. Add pyridine (6 ml.) pour into water and filter the resulting solid onto Super Cel. Dry the mixture then extract the Super Cel with ethyl acetate, filter and remove the solvent in vacuo. Dissolve the residue in tetrahydrofuran, treat with Nuchar charcoal and filter through Super Cel. Remove the solvent in vacuo and crystallize the residue from ether. Filter the white prisms to obtain 0.56 g. of pure title product; M.P. 154–156°;

$$\lambda_{max.}^{KBr} \ 2.90 \ \text{and} \ 5.88\mu$$

EXAMPLE 5 dl-3-methoxy-13-ethylgona-1,3,5(10)-triene-8,17-β-diol, 17-formate

Dissolve dl - 3 - methoxy - 13-ethylgona-1,3,5(10)-triene-8,17β-diol (2.00 g.) in dimethylformamide (30 ml.) then add methane sulfonyl chloride (6 ml.) and allow the reaction to stand at room temperature for 15 minutes. Pour the reaction into water, extract the mixture with ethyl acetate then wash, dry, and evaporate the solvent in vacuo. Crystallize the residue from benzene and filter to obtain the title product. Further purify the solid by treating its methylene chloride solution with Nuchra charcoal, filtering through Super Cel and replacing the solvent with benzene by boiling on the steam bath. Let stand to obtain 0.92 g. of the pure title product; M.P. 185–187°;

$$\lambda_{max.}^{KBr} \ 2.90 \ \text{and} \ 5.90\mu$$

*Analysis.*—Calcd. for $C_{21}H_{28}O_4$ (percent): C, 73.22; H, 8.19. Found (percent): C, 73.48; H, 8.26.

EXAMPLE 6 dl-3-methoxyestra-1,3,5(10)-tetraen-17β-ol, formate

Dissolve dl - 3 - methoxyestra-1,3,5(10),8-tetraen-17β-ol (2.0 g.) in dimethylformamide (30 ml.) and pyridine (15 ml.) then add methane sulfonyl chloride (5 ml.) and allow the reaction to stand at room temperature for 3 minutes. Pour the reaction into water, filter and dry the resulting solid. Chromatograph the solid in benzene on 10% silver nitrate impregnated alumina. Remove the solvent in vacuo then treat the residue in methylene chloride with Nuchar charcoal, filter through Super Cel, remove the solvent in vacuo and crystallize the residue from ethanol to obtain 1.20 g. of the crude title product, M.P. 100–102°. Further purify a sample (0.50 g.) by thick layer chromatography on silica gel to obtain by recrystallzation from methanol, 0.28 g. of the pure title product; M.P. 108–110°;

$$\lambda_{max.}^{KBr} \ 5.80\mu$$

EXAMPLE 7 dl-3-methoxyestra-1,3,5(10),8-tetraen-17β-ol, formate

Dissolve dl - 3 - methoxyestra-1,3,5(10),8-tetraen-17β-ol (2.00 g.) in dimethylformamide (30 ml.) then add methanesulfonyl chloride (5 ml.) and allow the soution to stand at room temperature for 15 minutes. Pour the reaction into water and when precipitation is complete filter and dry the resulting solid. Dissolve the solid in benzene and pass the solution through a double column consisting of a lower layer of 10% silver nitrate impregnated alumina and an upper layer of a fluorosilicite (Florex XXS). Remove the benzene in vacuo, dissolve the residue in methylene chloride, treat with Nuchar charcoal and filter through filter aid (Super Cel). Remove the solvent in vacuo and crystallize the residue from methanol to obtain 1.40 g. of the pure title product; M.P. 110–111°;

$$\lambda_{max.}^{KBr} \ 5.80\mu; \ \lambda_{max.}^{EtOH} \ 276 \ m\mu \ (\epsilon \ 16,800)$$

*Analysis.*—Calcd. for $C_{20}H_{24}O_3$ (percent): C, 76.89; H, 7.74. Found (percent): C, 76.90; H, 7.59.

EXAMPLE 8 d-Estra-1,3,5(10),7-tetraene-3,17β-diol, 17 formate

Dissolve d - estra - 1,3,5(10),7 - tetraene-3,17β-diol (1.00 g.) in dimethylformamide (15 ml.), add methanesulfonyl chloride (3 ml.) and allow the reaction to stand at room temperature for 20 minutes. Add pyridine (6 ml.) then pour the mixture into water. When precipitation is complete, filter the solid onto Super Cel, dry the mixture then extract the Super Cel with ethyl acetate and filter. Evaporate the ethyl acetate in vacuo, triturate the solid with ether and filter to obtain 0.66 g. of title product; M.P. 213–216°. Further purify a sample (0.57 g.) by dissolving in tetrahydrofuran, treating with Nuchar charcoal and filtering through Super Cel. Remove the solvent in vacuo, treat the residue with boiling ether and let stand. Filter to obtain 0.34 g. of title product; M.P. 219–222°;

$$\lambda_{max.}^{KBr} \ 3.07 \ \text{and} \ 5.98\mu$$

$[\alpha]_D + 161°$ (c.=1, dioxane).

EXAMPLE 9 dl-3-methoxyestra-1,3,5(10),8,14-pentaen-17β-ol, formate

Dissolve dl - 3 - methoxyestra-1,3,5(10),8,14-pentaen-17β-ol (1.50 g.) in dimethylformamide (25 ml.) then add methane sulfonyl chloride (5 ml.) and allow the reaction to stand at room temperature for 15 minutes. Add pyridine (10 ml.) then pour the solution into water. Extract the mixture with ether, wash, dry, and evaporate the solvent in vacuo. Scratch the residue with ether to obtain a seed then dissolve the residue in methylene chloride, treat with Nuchar charcoal, filter through Super Cel and remove the solvent in vacuo. Dissolve the residue in boiling methanol, cool, add a small amount of ether to remove cloudiness then seed and allow to stand to complete crystallization. Filter to obtain 1.33 g. of the pure title product; M.P. 102–104°;

$$\lambda_{max.}^{KBr} \ 5.85\mu; \ \lambda_{max.}^{EtOH} \ 311 \ m\mu. \ (\epsilon \ 32,300)$$

*Analysis.*—Calcd. for $C_{20}H_{22}O_3$ (percent): C, 77.39; H, 7.14. Found (percent): C, 77.27; H, 7.02.

EXAMPLE 10 dl-13-ethyl-17β-hydroxygona-4-en-3-one, formate

Dissolve dl - 13 - ethyl - 17β - hydroxygona-4-en-3-one (2.0 g.) in a freshly prepared mixture of dimethylformamide (25 ml.), pyridine (15 ml.) and methane sulfonyl chloride (5 ml.) and allow the reaction to stand at room temperature for 20 minutes. Pour the reaction into ice water, filter and dry the resulting solid. Chromatograph the product in benzene on 10% silver nitrate impregnated alumina then remove the solvent in vacuo. Crystallize the residue from isopropanol to obtain 1.22 g. of title product; M.P. 127–130°. Further purify a sample (0.30 g.) by thick-layer chromatography on silica gel and recrystallize the resulting material from ether to obtain 0.12 g. of pure title product; M.P. 140–142°;

$\lambda_{max.}^{KBr}$ 5.82 and 6.03$\mu$. $\lambda_{max.}^{EtOH}$ 240 m$\mu$ ($\epsilon$ 16,400)

*Analysis.*—Calcd. for $C_{20}H_{28}O_3$ (percent): C, 75.91; H, 8.92. Found (percent): C, 75.61; H, 8.83.

EXAMPLE 11 dl-3-methoxy-8α-estra-1,3,5(10)-triene-11,17β-diol, 17-formate

Dissolve dl - 3 - methoxy - 8α - estra-1,3,5(10)-triene-11,17β-diol (0.500 g.) in dimethylformamide (10 ml.) then add methane sulfonyl chloride (1.5 ml.) and allow the reaction to stand at room temperature for 20 minutes. Add pyridine (3 ml.) then pour into water. Filter and dry the resulting white solid, dissolve it in methylene chloride, treat with Nuchar charcoal and filter through Super Cel. Remove the solvent in vacuo and crystallize the residue from methanol to obtain 0.37 g. of the pure title product; M.P. 136–138°;

$\lambda_{max.}^{KBr}$ 292 and 5.86$\mu$

*Analysis.*—Calcd. for $C_{20}H_{26}O_4$ (percent): C, 72.70; H, 7.93. Found (percent): C, 72.79; H, 7.84.

EXAMPLE 12 d-Cholesterol formate

Dissolve d-chloesterol (2.0 g.) in dimethylformamide (25 ml.) then add methane sulfonyl chloride (5.0 ml.) and allow the reaction to stand at room temperature for 30 minutes. Add pyridine (15 ml.) and pour the mixture into ice-water. Filter, wash and dry the resulting white crystalline solid to get 2.1 g. of the title product; M.P. 92–96°. Further purify the sample by dissolving in warm acetone, filtering and allowing to stand to deposit 1.43 g. of pure title product; M.P. 94–96°;

$\lambda_{max.}^{KBr}$ 5.86$\mu$ $[\alpha]_D$—52° (c.=1, chf.).

EXAMPLE 13 d-Cholestanol formate

Add d-cholestanol (2.0 g.) to a freshly prepared mixture of dimethylformamide (25 ml.), pyridine (15 ml.) and methane sulfonyl chloride (5 ml.) and warm the mixture mildly to disolve the steroid, then allow the reaction to stand at room temperature for 40 minutes. Pour the reaction into ice-water then filter and dry the resulting solid to get 1.97 g. of crude title product; M.P. 74–80°. Further purify a sample (0.50 g.) by thick-layer chromatography on silica gel and recrystallize the product from isopropanol to obtain 0.08 g. of pure title product; M.P. 79–81°;

$\lambda_{max.}^{KBr}$ 5.79$\mu$

*Analysis.*—Calcd. for $C_{28}H_{48}O_2$ (percent): C, 80.71; H, 11.61. Found (percent): C, 80.83; H, 11.72.

EXAMPLE 14 dl-13-ethylgona-1,3,5(10)-triene-3,16α,17β-triol, 16-formate

Add dl - 13 - ethylgona - 1,3,5(10) - triene-3,16α,17β-triol (1.00 g.) to a freshly prepared mixture of dimethylformamide (15 ml.) and methanesulfonyl chloride (3 ml.) and allow the reaction to stand at room temperature for 30 minutes. Pour the reaction into water and filter the resulting precipitate onto Super Cel. Extract the dried Super Cel mixture with tetrahydrofuran, filter and remove the solvent in vacuo. Dissolve the residue in ethyl acetate, treat with Nuchar charcoal and filter through Super Cel. Remove the ethyl acetate in vacuo and crystallize the resulting oil from benzene to give 0.60 g. of prism clusters. Retreat the solid in tetrahydrofuran with Nuchar, filter through Super Cel, evaporate in vacuo and crystallize the oil from benzene to get 0.46 g. of pure title product as tiny prisms; M.P. 172–174° (polymorph).

$\lambda_{max.}^{KBr}$ 3.06, 5.87, 5.97 (carbonyl doublet) $\mu$

*Analysis.*—Calcd. for $C_{20}H_{26}O_4$ (percent): C, 72.70; H, 7.93. Found (percent): C, 72.68; H, 7.74.

EXAMPLE 15 d-estra-1,3,5(10)-triene-3,17β-diol, 3-hydrogen sulfate, potassium salt

Add d - estra - 1,3,5(10 - triene-3,17β-diol, 17-formate, prepared in the manner described above (3.00 g.) and pyridine-sulfur trioxide reagent (5.00 g.) to pyridine (50 ml.) and heat the mixture on a steam bath for 2 hours. Cool to room temperature, then pour the reaction into a solution of potassium hydroxide (6.0 g.) in water (200 ml.). Stir, then evaporate the resulting solution to dryness on the steam bath. Triturate the residue with tetrahydrofuran and filter. Remove the solvent in vacuo and dry the residue by azeotropic distillation of benzene. Evaporate to dryness and triturate the residue with ether. Filter to obtain 3.13 g. of title product. Dissolve the product in hot water, treat with Nuchar and filter through Super Cel. Allow the filtrates to stand to deposit 0.96 g. of the title product; M.P. 172–175° (hydrate);

$\lambda_{max.}^{KBr}$ 3.0$\mu$

EXAMPLE 16

In the same manner as Example 10, the following steroidal alcohols (A) may be converted to formates (B)

| A: | B |
|---|---|
| Androstan-3β,11β-diol-17-one | 3-formate. |
| Androst-5-ene-3β,17β-diol | di-formate. |
| Androst-5-ene-3β,17β-diol-17-acetate | 3-formate. |
| Androst-5-ene-3β,17β-diol-17-benzoate | 3-formate. |
| Corticosterone | 21-formate. |
| α-Estradiol | 17-formate. |
| Hydrocortisone | 21-formate. |
| Estrane-3α,17α-diol | Diformate. |
| Testosterone | Formate. |

The following examples further illustrate the utility of selective formylation to protect one hydroxy group while modifying another.

EXAMPLE 17 dl-3-cyclopentyloxy-13-ethylgona-1,3,5(10)-triene-16α,17β-diol, 16 formate

Cool dimethylformamide (120 ml.) in an ice-bath then add methanesulfonyl chloride (18 ml.) and with stirring add dl - 3-cyclopentyloxy-13-ethylgona-1,3,5(10)-triene-16α,17β-diol (6.3 g.). Remove the ice-bath and stir the reaction at room temperature for 25 minutes. Pour the reaction into water, stir then add pyridine (60–70 ml.) slowly to neutralize the solution. Filter the white crystalline solid and dry ($P_2O_5$/vacuum) to get 5.1 g. of crude title product; M.P. 140–143°. Further purify a sample (1.1 g.) by dissolving in methylene chloride, treating with Nuchar charcoal and filtering through filter aid. Remove the methylene chloride in vacuo and crystallize the residue from ether-hexane. Filter the resulting white flaky needles to get 0.84 g. of the pure title product; M.P. 150–152°, $\lambda_{max.}^{KBr}$ 2.91 and 5.86$\mu$

*Analysis.*—Calcd. for $C_{25}H_{34}O_4$ (percent): C, 75.34; H, 8.60. Found (percent): C, 75.25; H, 8.42.

EXAMPLE 18 dl-3-cyclopentyloxy-13-ethyl-16α-hydroxygona-1,3,5(10)-trien-17-one, 16 formate

Dissolve the product of Example 17, namely, dl-3-cyclopentyloxy - 13-ethylgona-7,3,5(10)-triene-16α,17β-diol, 16-formate (4.00 g.) in acetone (250 ml.), cool in an ice-bath then add anhydrous sodium sulfate 8 g.). With stirring add 8 N chromic acid solution (total 8 ml.) dropwise to get a permanent red color. Quench the excess reagent by adding isopropanol (10 ml.) then add water (500 ml.). Extract the mixture with ether then wash and dry the extract and remove the solvent in vacuo. Dissolve the resulting oil in methylene chloride, treat with Nuchar charcoal and filter the solution through filter aid. Remove the solvent in vacuo and crystallize the resulting oil from absolute ethanol. Filter the resulting white granular solid to get 3.11 g. of the pure title product; M.P. 134–136°;

$\lambda_{max.}^{KBr}$ 5.73 and 5.81μ

*Analysis.*—Calcd. for $C_{25}H_{32}O_4$ (percent): C, 75.72; H, 8.13. Found (percent): C, 75.61; H, 8.03.

EXAMPLE 19 dl-3-cyclopentyloxy-13-ethyl-16α-hydroxygona-1,3,5(10)-trien-17-one

To a solution of potassium hydroxide (0.25 g.) in anhydrous methanol (25 ml.) add the product of Example 18, namely, solid, dl - 3-cyclopentyloxy-13-ethyl-16α-hydroxygona-1,3,5(10)-trien-17-one, 16 formate (0.50 g.). Stir the reaction at room temperature for 30 minutes then add water (100 ml.) dropwise to fully precipitate the product. Filter the white solid onto filter aid and air-dry the mixture of solids. Extract the mixture of product and filter aid with methylene chloride, filter and remove the solvent in vacuo. Crystallize the resulting oil from isopropanol to obtain 0.30 g. of the title product as white cottony needles; M.P. 164–165°;

$\lambda_{max.}^{KBr}$ 3.0 and 5.75μ

The formate esters have essentially the same hormonal activity as the starting steroids from which they are made. Thus, referring to the type compounds identified earlier as I, II, III, IV, and V, these are estrogenic in character and have estrogenic utility. Particularly, such compounds have been found to lower blood cholesterol levels significantly. On the other hand formate esters of type VI have essentially androgenic activity while formate esters falling within the scope of type VII have the hormonal activity or other uses of the starting material, e.g., androgenic or emulsifying utility in medicinal preparations.

EXAMPLE 20 dl-13-ethyl-3,16α-dihydroxygona-1,3,5(10)-trien-17-one

Dissolve dl - 13-ethylgona-1,3,5(10)-triene-3,16α,17β-triol, 16-formate (9.00 g.) in dry acetone (300 ml.) add sodium sulfate (10.0 g.) then cool with an ice-methanol bath. With stirring add excess 8 N chromic acid solution (about 10 ml.), dropwise until a permanent ruddy color is obtained. Stir a further ten minutes then quench the reaction with isopropanol (30 ml.) and water (1 liter). Extract the mixture with ethyl acetate, wash, dry and evaporate the solvent in vacuo. Cover the resulting oil with methylene chloride to initiate crystallization then dilute with ether. Filter to obtain 5.4 g. of crude solid. Dissolve the solid in tetrahydrofuran, treat with Nuchar charcoal and filter. Remove the solvent in vacuo, dissolve the resulting oil in absolute ethanol and quickly filter the solution through filter aid. Let stand then filter to obtain 3.25 g. of dark solid, M.P. 210–212° C.;

$\lambda_{max.}^{KBr}$ 3.00, 5.75 and 5.85μ

Add a portion of this solid (3.20 g.) to a cooled solution of potassium hydroxide (1.50 g.) in methanol (150 ml.). Stir, then warm on a steam-bath for ten minutes. Cool and stir the reaction at room temperature for one/half hour. Add water until the solution is clear, stir fifteen minutes more then add saturated ammonium chloride solution (300 ml.). Extract the mixture with ethyl acetate. Wash, dry and evaporate the solvent in vacuo then triturate the residue with ether. Filter to obtain 2.00 g. of the crude title product. Dissolve the solid in tetrahydrofuran, treat wtih Nuchar charcoal, filter and remove the solvent in vacuo. Dissolve the resulting oil in absolute ethanol. Cool then add distilled water dropwise to cloudiness. Let stand to complete crystallization then filter to obtain 1.65 g. of the pure title product, M.P. 193–195° C.;

$\lambda_{max.}^{KBr}$ 2.90, 3.12 and 5.75μ

EXAMPLE 21 dl-13-ethyl-3,17β-di(tetrahydropyran-2-yloxy)gona-1,3,5(10)-trien-16α-ol

Stir a mixture of dl-13-ethylgona-1,3,5(10)-triene-3,16α,17β-triol, 16-formate (3.00 g.) and purified dihydropyran (50 ml.), cool with an ice-methanol bath then add phosphorus oxychloride (15 drops). Gently reflux the reaction for one-half hour, cool and allow the reaction to stand at room temperature for eighteen hours. Add sodium methoxide (3.5 g.) as a solid, stir for one-half hour then add water and extract the mixture with ether-ethyl acetate. Wash, dry and evaporate the extract in vacuo to an oil. Dissolve the oil in methanol (100 ml.), stir then add sodium methoxide (1.00 g.). Stir the reaction for one-half hour then add water (250 ml.) and extract the mixture with ether-ethyl acetate. Wash, dry and evaporate the extract in vacuo. Dissolve the resulting oil in methanol, filter and remove the solvent in vacuo. Crystallize the resulting oil from hexane to get 2.47 g. of the title product, M.P. 118–122° C.;

$\lambda_{max.}^{KBr}$ 2.89μ

*Analysis.*—Calcd. for $C_{29}H_{42}O_5$ (percent): C, 74.01; H, 9.00. Found (percent): C, 73.68; H, 8.69.

EXAMPLE 22 dl-13-ethyl-3,17β-di(tetrahydropyran-2-yloxy)gona-1,3,5(10)-trien-16-one

Cool pyridine (100 ml. with an ice-methanol bath then with stirring carefully add a solution of chromium trioxide (12.0 g.) in water (30 ml.) dropwise. Add a solution of dl - 13-ethyl-3,17β-di(tetrahydropyran-2-yloxy)gona-1,3,5(10)-trien-16α-ol (6.0 g.) in pyridine (50 ml.) and stir the reaction at room temperature for twenty-four hours. Add water and extract the mixture with ether. Wash, dry and evaporate the extract in vacuo. Dissolve the resulting oil in benzene, pass the solution through a column of Florex and remove the benzene in vacuo. Treat the resulting oil in methylene chloride with Nuchar charcoal, filter and replace the solvent with absolute ethanol by boiling on the steam bath. Let the solution stand to complete crystallization. Filter to obtain 3.50 g. of the pure title product, M.P. 140–145° C.;

$\lambda_{max.}^{KBr}$ 5.72μ

*Analysis.*—Calcd. for $C_{29}H_{40}O_5$ (percent): C, 74.32; H, 8.60. Found (percent): C, 74.16; H, 8.27.

EXAMPLE 23 dl-13-ethyl-3,17β-dihydroxygona-1,3,5(10)-trien-16-one

To a stirred mixture of dl-13-ethyl-3,17β-di(tetrahydropyran-2-yloxy)gona - 1,3,5(10) - trien - 16 - one (2.00 g.) and methanol (100 ml.) add concentrated hydrochloric acid (30 drops) and continue stirring for one hour. To the clear solution add water dropwise to fully precipitate the crystalline product. Filter and dry to obtain 1.27 g. of product, M.P. 215–218° C. Dissolve the solid in tetrahydrofuran, treat with Nuchar charcoal, filter and remove the solvent in vacuo. Dissolve the resulting oil in warm benzene and let stand to fully crystallize. Filter to obtain 1.13 g. of the pure title product, M.P. 217–219° C.;

$\lambda_{max.}^{KBr}$ 3.0 and 5.77μ

*Analysis.*—Calcd. for $C_{19}H_{24}O_3$ (percent): C, 75.97; H, 8.05. Found (percent): C, 76.28; H, 8.44.

The above-stated pharmacological utility is elicited by submitting the compounds to acceptable, standard testing procedures known to those skilled in the art. For example, activity in the hormonal field would be found by following the described procedures of Edgren et al. in "Recent Progress in Hormone Research," Academic Press Inc., vol. 22, pages 305–349 (1966).

The ester formates obtained by treating the aforesaid type compounds retain essentially the same biological properties and the utilities of the substrates themselves. The notable difference would be a moderate increase in the duration of activity in the animal body, with little or no increase in toxicity. Thus, one could use the formate esters either above or in usual compositions at the same dosage levels and in the same way as their known hydroxy counterparts, for example, in the field of experimental pharmacology or in human therapy. Considered generally and, of course, depending on the route of administration, whether orally, intramuscularly, or subcutaneously, the dosage level capable of eliciting the steroidal or hormonal action falls generally in the dosage range of 0.1 to 10 mg./kg. of body weight. Selection of the proper dosage depends on the mode of administration and the subject and is deemed to fall within the scope and skill of the pharmacologist or medical practitioner.

What is claimed is:

1. A process of selectively esterifying to a formate ester the 17β-hydroxyl of a steroidal alcohol of the formula:

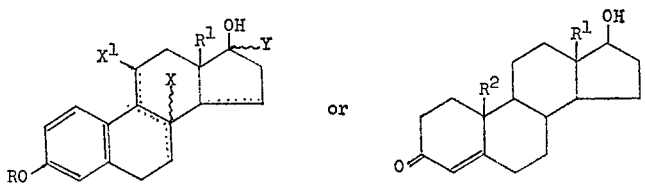

wherein R is selected from the group consisting of hydrogen, (lower)alkyl of 1 to 6 carbon atoms, (lower)cycloalkyl of 3 to 6 carbon atoms, (lower)alkanoyl of 1 to 6 carbon atoms and benzoyl; $R^1$ is (lower)alkyl of 1 to 4 carbon atoms; $R^2$ is selected from the group consisting of hydrogen and (lower)alkyl; X and $X^1$ are independently selected from the group consisting of hydrogen and hydroxyl; Y is selected from the group consisting of hydrogen, (lower)alkyl of 1 to 3 carbon atoms, (lower)alkenyl of 2 to 3 carbon atoms and (lower)alkynyl of 2 to 3 carbon atoms; the dotted lines represent optional double bonds; and the wavy lines (~~~) represent α or β configuration, which comprises reacting the steroidal alcohol with an alkane sulfonyl halide of 1 to 6 carbon atoms and dimethylformamide in a range of about 0° to 40° C. for a period of from several minutes to not more than two hours, thereby forming a formate ester at the 17β-hydroxyl.

2. The process of claim 1, characterized in that the alkane sulfonyl halide is methane sulfonyl chloride.

3. The process of claim 1, characterized in that the reaction is carried out at room temperature for a time period ranging from 3 minutes to 60 minutes.

4. The process of claim 1, characterized in that the steroidal alcohol is of the formula:

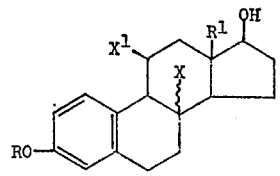

5. The process of claim 4 wherein the steroidal alcohol is: dl-3-methoxyestra-1,3,5(10)-trien-17β-ol.

6. The process of claim 4 wherein the steroidal alcohol is: dl - 13-ethyl-3-methoxy-8α-gona-1,3,5(10)-trien-17β-ol.

7. The process of claim 4 wherein the steroidal alcohol is: d-estra-1,3,5(10)-trien-3,17β-diol.

8. The process of claim 4 wherein the steroidal alcohol is: dl-3-methoxyestra-1,3,5(10)-triene-8,17β-diol.

9. The process of claim 4 wherein the steroidal alcohol is: dl - 3 - methoxy-13-ethylgona-1,3,5(10)-triene-8-17β-diol.

10. The process of claim 4 wherein the steroidal alcohol is: dl-3-methoxy-8α-estra-1,3,5(10)-triene-11,17β-diol.

11. The process of claim 1, characterized in that the steroidal alcohol is of the formula:

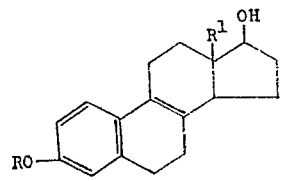

12. The process of claim 11 wherein the steroidal alcohol is: dl-3-methoxyestra-1,3,5(10),8-tetraen-17β-ol.

13. The process of claim 1, characterized in that the steroidal alcohol is of the formula:

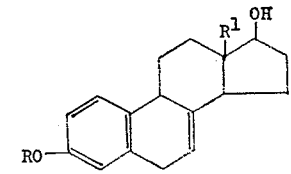

14. The process of claim 13 wherein the steroidal alcohol is: d-estra-1,3,5(10),7-tetraene-3,17β-diol.

15. The process of claim 1, characterized in that the steroidal alcohol is of the formula:

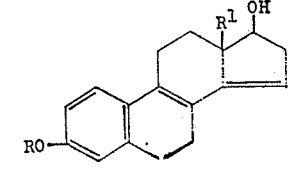

16. The process of claim 15 wherein the steroidal alcohol is: dl-3-methoxyestra-1,3,5(10),8,14-pentaen-17β-ol.

17. The process of claim 1, characterized in that the steroidal alcohol is of the formula:

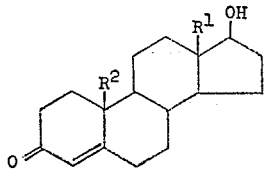

18. The process of claim 17 wherein the steroidal alcohol is: dl-13-ethyl-17β-hydroxygona-4-en-3-one.

19. A process of esterifying to a formate ester the 3-hydroxy group of d-cholesterol or d-cholestanol which comprises reacting d-cholesterol or d-cholestanol with an alkane sulfonyl halide of 1 to 6 carbon atoms and dimethylformamide in a range of about 0° to 40° C. for a period of from several minutes to not more than two hours.

20. The process of claim 19, characterized in that the alkane sulfonyl halide is methane sulfonyl halide.

21. A process of selectively esterifying to a formate ester the 16-hydroxyl of a steroidal alcohol of the formula:

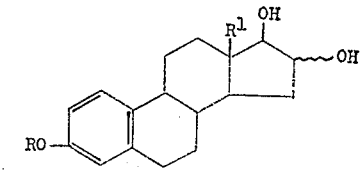

wherein R is selected from the group consisting of hydrogen, (lower)alkyl of 1 to 6 carbon atoms, (lower)-cycloalkyl of 3 to 6 carbon atoms, (lower)alkanoyl of 1 to 6 carbon atoms and benzoyl; $R^1$ is a (lower)alkyl of 1 to 4 carbon atoms; and the wavy line ( ~~~ ) represents α or β configuration, which comprises reacting the steroidal alcohol with an alkane sulfonyl halide of 1 to 6 carbon atoms and dimethylformamide in a range of about 0° to 40° C. for a period of several minutes to not more than two hours, thereby forming a formate ester only at the 16-hydroxyl.

22. The process of claim 21, characterized in that the alkane sulfonyl halide is methane sulfonyl chloride.

23. The process of claim 21 wherein the steroidal alcohol is: dl-13-ethylgona-1,3,5(10)-triene-3,16α,17β-triol.

24. The process of claim 21 wherein the steroidal alcohol is: dl-3-cyclopentyloxy-13-ethylgona-1,3,5(10)-triene-16α,17β-diol.

25. dl-13-ethyl-3,17β-di(tetrahydropyran-2-yloxy)-gona-1,3,5(10)-trien-16α-ol.

26. dl-13-ethyl-3,17β-di(tetrahydropyran-2-yloxy)-gona-1,3,5(10)-trien-16-one.

References Cited

UNITED STATES PATENTS

| | | | |
|---|---|---|---|
| 2,611,773 | 9/1952 | Ott | 260—397.5 |
| 2,867,630 | 1/1959 | Pederson et al. | 260—397.3 |
| 3,377,363 | 4/1968 | Tadanier | 260—397.4 |
| 3,401,181 | 9/1968 | Klimstra | 260—397.5 |

OTHER REFERENCES

Loewenthal: Tetrahedron, vol. 6, No. 4 (1959), pp. 300 and 301.

Applezweig: Steroid Drugs (1962), p. 451.

HENRY A. FRENCH, Primary Examiner

U.S. Cl. X.R.

260—397.2, 397.4, 397.45, 397.5, 999